(12) United States Patent
Everhart et al.

(10) Patent No.: US 7,660,964 B2  
(45) Date of Patent: Feb. 9, 2010

(54) WINDOWING EXTERNAL BLOCK TRANSLATIONS

(75) Inventors: Craig F. Everhart, Chapel Hill, NC (US); Venkateswarara Jujjuri, Beaverton, OR (US); Malahal R. Naineni, Tigard, OR (US); Rohit K. Prasad, Beaverton, OR (US); Senthil Rajaram, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 11/195,152

(22) Filed: Aug. 2, 2005

(65) Prior Publication Data

US 2007/0033372 A1 Feb. 8, 2007

(51) Int. Cl.  
*G06F 12/00* (2006.01)

(52) U.S. Cl. .................. 711/202; 711/105; 711/118

(58) Field of Classification Search ........... None  
See application file for complete search history.

(56) References Cited

U.S. PATENT DOCUMENTS

| | | | |
|---|---|---|---|
| 5,278,963 A * | 1/1994 | Hattersley et al. | 711/204 |
| 5,956,753 A * | 9/1999 | Glew et al. | 711/205 |
| 6,658,540 B1 | 12/2003 | Sicola et al. | |
| 7,165,147 B2 * | 1/2007 | Ting et al. | 711/137 |
| 7,181,578 B1 * | 2/2007 | Guha et al. | 711/154 |
| 2002/0083187 A1 | 6/2002 | Sim et al. | |
| 2004/0028068 A1 | 2/2004 | Kizhepat | |
| 2006/0015699 A1 * | 1/2006 | Fujiwara et al. | 711/162 |

* cited by examiner

*Primary Examiner*—Sanjiv Shah  
*Assistant Examiner*—Midys Rojas  
(74) *Attorney, Agent, or Firm*—Lieberman & Brandsdorfer, LLC (57) ABSTRACT

A buffer of block addresses for use by a client for read and write operations in a client-server system is maintained. Block addresses are maintained in the buffer and are streamed to the client in response to a request for the addresses to support a read or write operation. The quantity of addresses maintained in the buffer may be dynamically adjusted in response consumption of addresses for read and write operations.

15 Claims, 5 Drawing Sheets

WINDOWING EXTERNAL BLOCK TRANSLATIONS

BACKGROUND OF THE INVENTION

1. Technical Field

This invention relates to managing metadata in response to read and write operations. More specifically, a technique is provided to maintain a window of address translations for use in both read and write operations in a shared file system.

2. Description of the Prior Art

Figure 1:
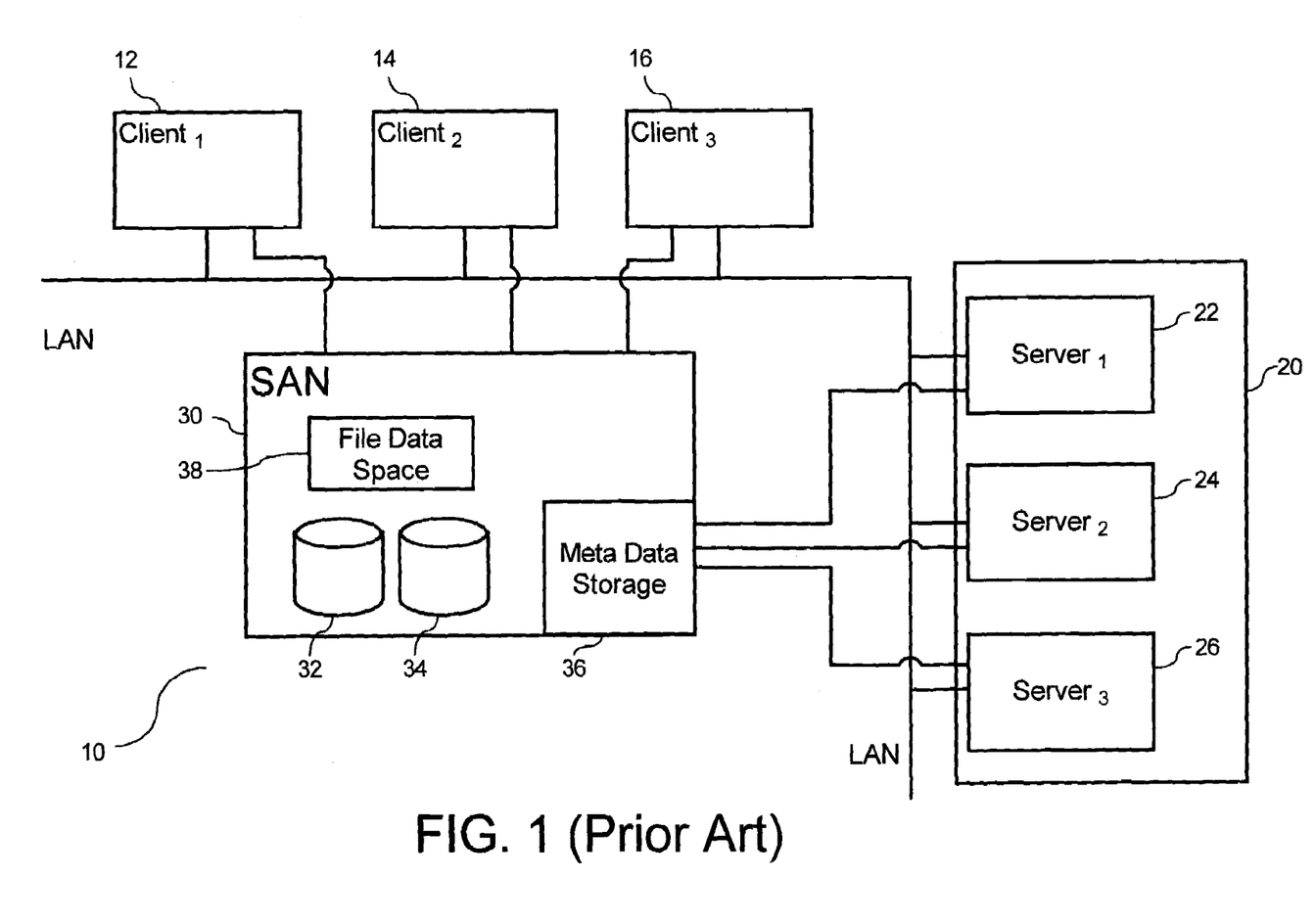
FIG. 1 is a block diagram of a block diagram of a prior art distributed file system.

FIG. 1 is a prior art block diagram (10) of a distributed file system including a server cluster (20), a plurality of client machines (12), (14), and (16), and a storage area network (SAN) (30). Each of the client machines communicate with one or more server machines (22), (24), and (26) in server cluster (20) over a data network (40). Similarly, each of the client machines (12), (14), and (16) and each of the server machines in the server cluster (20) are in communication with the storage area network (30). The storage area network (30) includes a plurality of shared disks (32) and (34) that contain only blocks of data for associated files. Similarly, the server machines (22), (24), and (26) manage metadata located in the meta data storage space (36) of the storage area network (30) pertaining to location and attributes of the associated files. Each of the client machines may access an object or multiple objects stored on the file data space (38) of the SAN (30), but may not access the metadata space (36). In opening the contents of an existing file object on the storage media in the SAN (30), a client machine contacts one of the server machines to obtain object metadata and locks. Typically, the metadata supplies the client with information about a file, such as its attributes and location on storage devices. Locks supply the client with privileges it needs to open a file and read or write data. The server machine performs a look-up of metadata information for the requested file within metadata space of the SAN (30). The server machine communicates granted lock information and file metadata to the requesting client machine, including the addresses of all data blocks making up the file. Once the client machine holds a lock and knows the data block address or addresses, the client machine can access the data for the file directly from a shared storage device (32) or (34) attached to the SAN (30). The quantity of elements in the system (10), including server nodes in the cluster, client machines, and storage media are merely an illustrative quantity. The system may be enlarged to include additional elements, and similarly, the system may be reduced to include fewer elements. As such, the elements shown in FIG. 1 are not to be construed as a limiting factor.

As shown in FIG. 1, the illustrated distributed file system separately stores metadata and data. In one example, one of the servers in the server cluster (20) holds information about shared objects, including the addresses of data blocks in storage that a client may access. To read a shared object, the client obtains the file's data block address or addresses from the server and then reads the data from the storage at the given block address or addresses. Similarly, when writing to a shared object, the client requests the server to create storage block addresses for data and then requests the allocated block addresses to which the data will then be written. One known method for reading a shared object uses a sequential block allocation method. For a shared object that is read sequentially, the client asks the server for the data block addresses corresponding to a first segment. Upon receiving the block addresses, the client reads the data in the first segment. If the application requires the client to read beyond the first segment, the client asks the server for the data block addresses corresponding to the next segment, and upon receipt of the block addresses, the client reads the data in the next segment. Similarly, for a sequential write operation, the client asks the server to allocate space for a first segment. Upon receiving the data block addresses for the first segment, the client writes data into the data blocks in the first segment. If the application requires additional segments, the client sends a communication to the server to allocate space for a second segment, and the client writes data into the blocks of the next segment upon receiving the data block addresses. Both the read and write operations of the sequential block allocation method require the client to request from the server data block addresses for successive addresses within the shared object during a read or write procedure. The client uses these data block addresses to translate read or write operations on the object to read or write operations on the storage device. Because the client remembers the correspondence between data addresses within the object and data addresses within the storage device, the remembered data block addresses that were fetched from the server are called address translations, as they let the client translate an object-relative address into an address within the storage device. Similarly, the request from the client to the server for data block addresses is sometimes called an address translation request. Accordingly, the sequential block allocation technique requires additional client-server communications if an initial allocation request does not provide a sufficient quantity of data block addresses.

As explained above, the sequential block allocation technique supports a plurality of client-server communications, in response to insufficiency of data block addresses in an initially returned segment. This results in an increased bandwidth consumption, also known as increased network traffic. Therefore, there is a need for a technique that mitigates client-server communications for block address translations for each read and each write operation. Such a technique should ensure mitigation of network traffic by decreasing the quantity of client-server transactions, as well as mitigation of wastage of disk space.

SUMMARY OF THE INVENTION

This invention comprises a windowing technique that stores block address translations for use in read and write operations.

In one aspect of the invention, a method is provided for managing metadata. A block address request is sent, and an address translation is received in response to the block address request. A buffer of available block addresses is maintained for use by the client. The size of the buffer may be modified based on a rate of use of the block addresses by the client for reading data.

In another aspect of the invention, a system is provided for allocating metadata. A buffer manager is provided to communication a block address request. The buffer manager receives a requested block address in response to the request. A buffer in communication with the buffer manager maintains the received block address for use by a client.

In yet another aspect of the invention, an article is provided with a computer readable signal bearing medium. Instructions in the medium are provided for sending a block address request, and instructions in the medium are provided for receiving an address translation in response to the address request. In addition, instructions in the medium are provided for maintaining a buffer of available block addresses for use by a client.

In a further aspect of the invention, a method is provided for managing allocation of metadata. A metadata block address request is received; and metadata block addresses are streamed to a buffer maintained by a client responsive to said request. The buffer maintains the streamed block addresses for use by the client.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Block address requests from a client to a server occur asynchronously with read and write operations. Additional block addresses for sequential data segments are maintained in a variable-sized buffer and made available during both read and write operations. If a read operation requires additional data block addresses, a sufficient quantity of block addresses are maintained in the buffer. Similarly, if a write operation requires an allocation of additional blocks and the addresses of the allocated blocks, such addresses are maintained in the buffer. The storage of additional block addresses in the buffer reduces client-server communications during both read and write operations. Similarly, the size of the buffer is dynamically adjusted based upon current and historical behavior patterns associated with actual read and/or write operations. By adjusting the buffer size, also known as the window, based upon such usage, a more accurate estimate of the need for block addresses is maintained.

Technical Details

Figure 2:
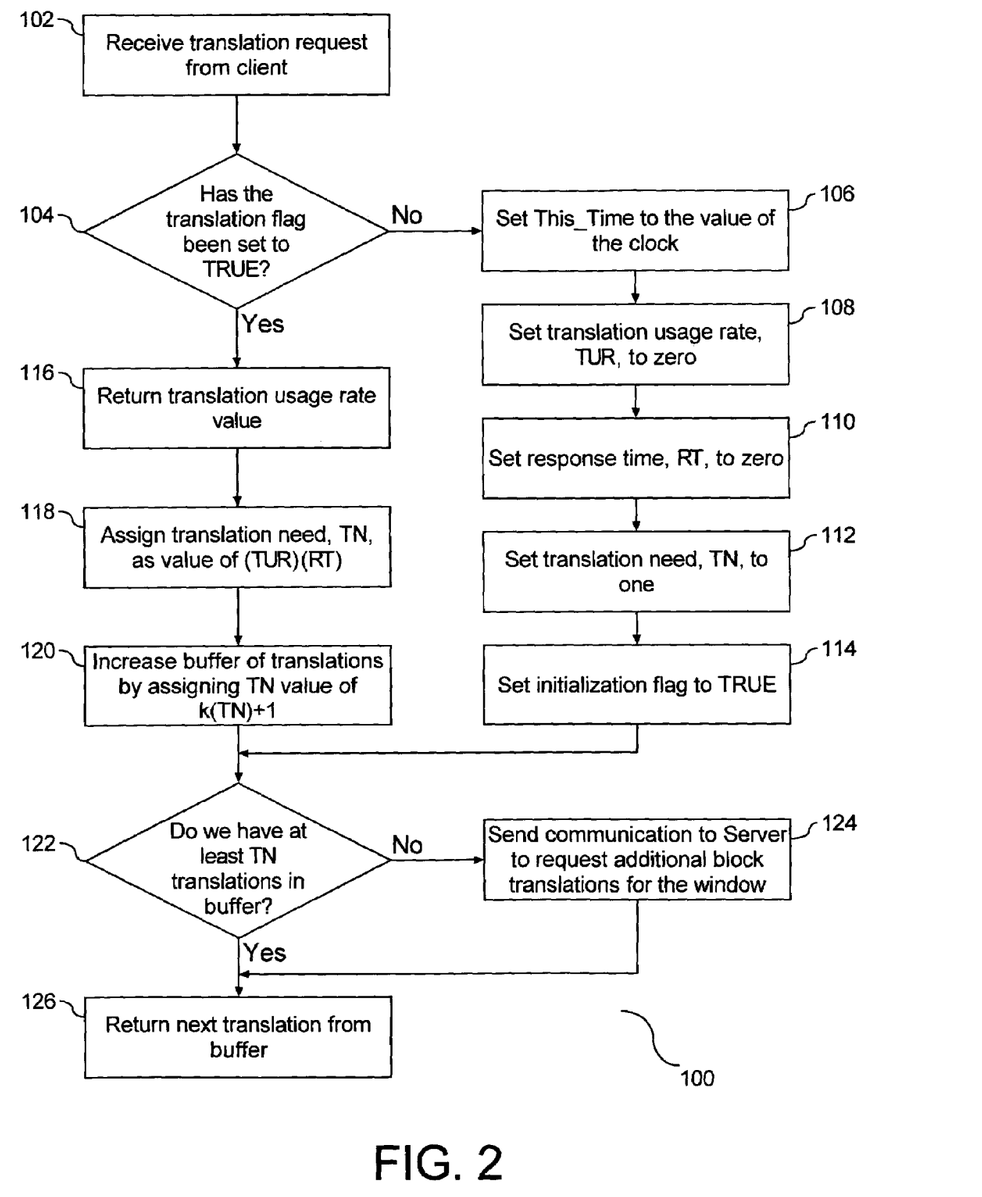
FIG. 2 is a flow chart illustrating how block addresses are maintained in a buffer for read and write operations to a shared object according to the preferred embodiment of this invention, and is suggested for printing on the first page of the issued patent.

FIG. 2 is a flow chart (100) showing how block addresses are maintained by a client in a buffer to address efficiency in read and write operations to a shared object in a client-server file system. A window is a quantity of block addresses stored by the buffer for sequential data segments. The collection of block addresses for read and write transactions is also known as address translations. This flow chart is applicable to both read and write operations as it focuses on maintaining block addresses. As shown, the server receives a block address request from a client (102). Following receipt of the request, a test is conducted to determine if a translation initialization flag is set to True (104). The translation initialization flag is used to determine if the buffer has been established. A false response to the test at step (104) is an indication that this is the first request for a block address and that the process for determining that number of block addresses for the buffer needs to be initialized. This initialization process includes capturing the value of the clock and setting a This_Time variable to the captured value (106), setting a translation usage rate variable, TUR, to zero (108), setting a response time variable, RT, to zero (110), setting a translation need variable, TN, to one (112), and setting the initialization flag to true (114). The collection of steps (106), (108), (110), (112), and (114) provide the establishment of the buffer and maintenance of translations in the buffer.

Figure 4:
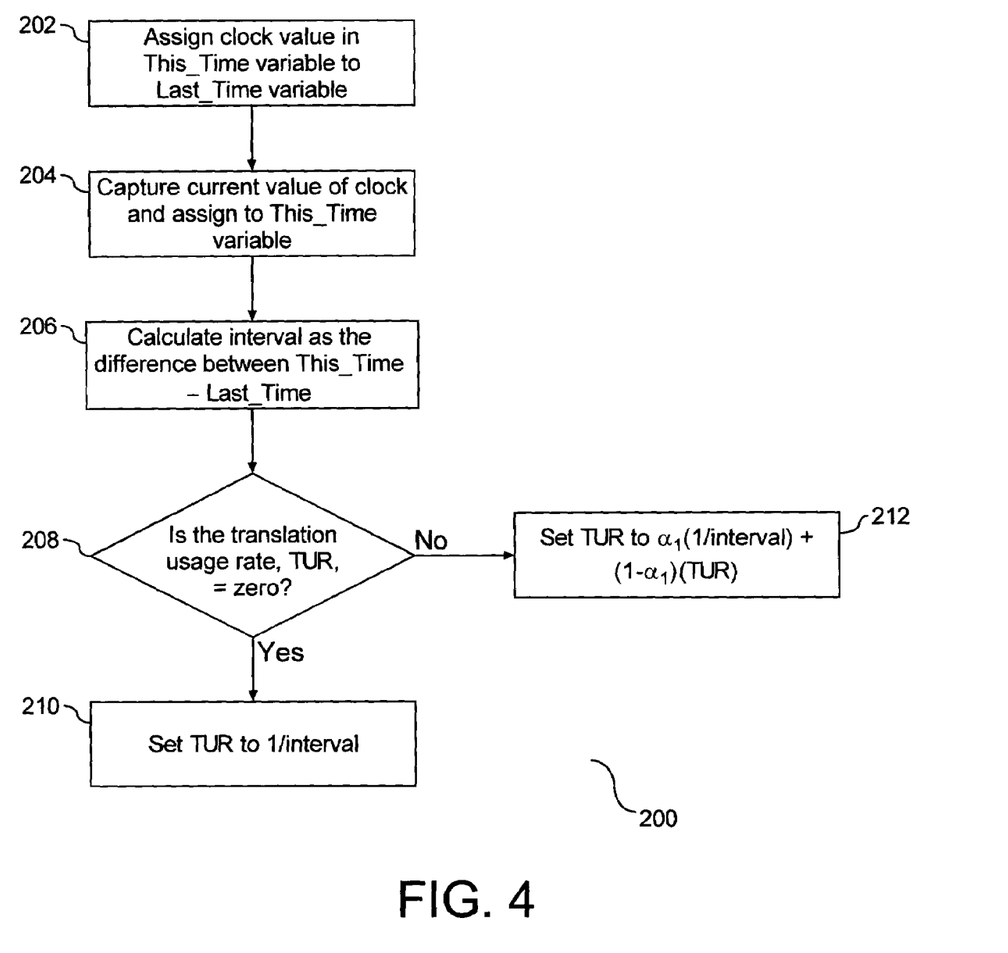
FIG. 4 is a flow chart illustrating a process for estimating usage rate of address translations in response to an address translation request.

A positive response to the test at step (104) is an indication that the buffer and an associated window of addresses have been established. The window is the quantity of block addresses stored by the buffer for sequential data segments. The current value of the translation usage rate, TUR, is returned (116). The TUR is the frequency in which address translations are used by a client in response to an address translation request. In one embodiment, a client may read or write data using the address translations in the buffer, while additional addresses are being provided or created by the server, respectively, and communicated to the buffer for current or future transactions. For a read transaction, the client may use available address translations in the buffer to obtain block addresses in storage media for reading specified data. While the client is conducting the read transaction, the server forwards additional address translations to the buffer based upon the TUR to ensure that there is a sufficient quantity of addresses available in the buffer to satisfy the client for the current transaction, as well as future transactions. For a write transaction, the client may use available address translations in the buffer to obtain block addresses in storage media available to store data. While the client is conducting the write transaction, the server forwards additional address translations to the buffer based upon the TUR to ensure that there is a sufficient quantity of addresses available in the buffer to satisfy the current write transaction, as well as future transactions. FIG. 4 described in detail below outlines how the translation usage rate is determined.

Following step (116), the translation need variable, TN, is assigned the value (118) of the product as follows:

$$TN \leftarrow (TUR) \times (RT)$$

Figure 3:
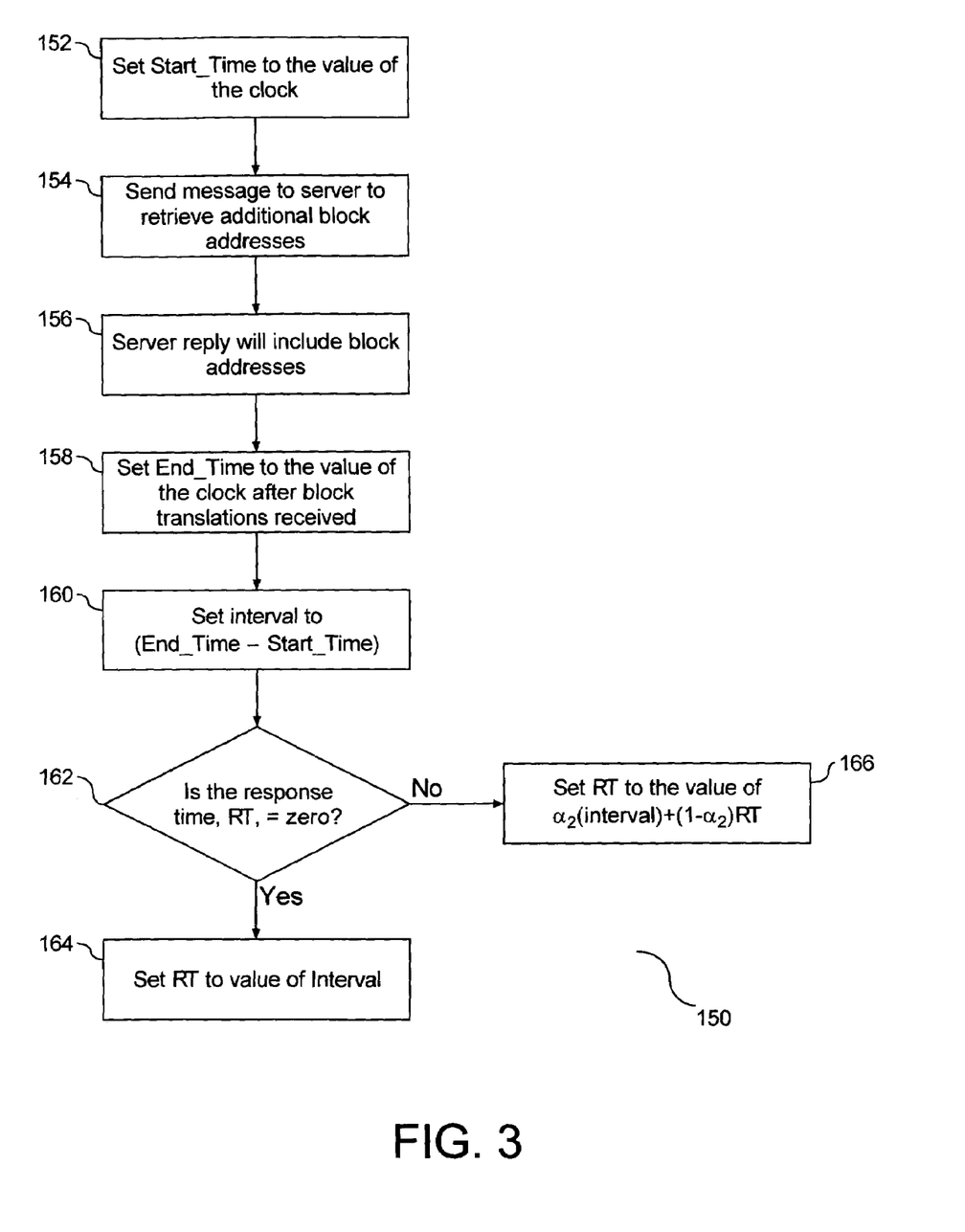
FIG. 3 is a flow chart illustrating a process for maintaining an estimate of response time to an address translation request.

The translation need variable, TN, represents the quantity of block addresses required by one or more clients. The translation need calculated at step (118) is the minimum quantity of block address to be stored in the buffer based upon the usage rate of the client (TUR) and the responsiveness rate (RT) of the server. The size of the window, i.e. the quantity of translations to be stored in the buffer, is increased by assigning the translation need to a value (120) as follows:

$$TN \leftarrow k(TN)+1,$$

where k is a constant. In one embodiment, the value of the constant k is chosen so that the block address need is estimated to be at least as large as a rate matching a client calculated rate of block address usage. The value of the constant may be dynamically adjusted based upon the rate of use of the addresses by the client for reading or writing data. Following step (120) or step (114), a test (122) is conducted to determine if the number of block addresses in the buffer meets or exceeds the TN value assigned at either step (112) or step (120). A negative response to the test at step (122) will result in sending a communication to the server to request additional block addresses for the window (124), as shown in detail in FIG. 3. Following step (124) or a positive response to the test at step (122), block addresses are returned to the requesting caller from the block address window (126).

As noted in FIG. 2 above, the time required by the server to respond to a client request for a block address to be maintained in the buffer is stored as a variable, RT. FIG. 3 is a flow chart (150) illustrating the process for calculating the RT variable. The value of the clock is captured and a Start_Time variable is set to the captured value (152) when the transaction is initiated between the client and the server. Following capture of the clock value at step (152), a message is sent to the server to retrieve additional block addresses (154). A server reply to the client will include additional block addresses for the buffer (156). For a write transaction, the server may also create some of the block addresses that it returns to the client for storage in the buffer. When the block addresses, i.e. address translations, are received by the client, the value of the clock is captured and a variable End_Time is set to the captured value (158). The time interval between which the client sent the block address request to the server and received block addresses from the server is calculated (160) as follows:

$$\text{Interval} \leftarrow \text{End\_Time} - \text{Start\_Time}$$

Before an estimate of the response time of the server is determined, a test is conducted to determine if the response time variable, RT, has a value of zero (162). The response time variable, RT, will have a value of zero if the system has just been initialized, in steps 106 through 114 of FIG. 2. A positive response to the test at step (162) is an indication that the response time variable needs to be initialized and will result in setting the response time variable (164), RT, to the Interval value captured at step (160). However, a negative response to the test at step (162) will result in setting the response time variable, RT (166) as follows:

$$RT \leftarrow \alpha_2(\text{Interval}) + (1-\alpha_2)(RT),$$

where $\alpha_2$ is a constant between zero and one. Accordingly, the process of maintaining an estimate of the response time of the server includes returning block addresses to the requesting client from the buffer.

In addition, as noted in FIG. 2 above, the rate at which address translations are used by a requesting client is maintained as a variable, TUR. FIG. 4 is a flow chart (200) illustrating the process for calculating the TUR variable. The value of the clock at the beginning of the last address translation that was stored in the variable This_Time is assigned to a variable Last_Time (202), and the current value of the clock is then captured and assigned to the variable This_Time (204). An interval defined by the captured clock values at steps (202) and (204) is calculated (206) as follows:

$$\text{Interval} \leftarrow \text{This\_Time} - \text{Last\_Time}$$

Following the calculation of the time interval at step (206), a test is conducted to determine if the translation usage rate has a value of zero (208). The address translation rate, TUR, will have a value of zero if the system has just been initialized, in steps 106 through 114 of FIG. 2. As defined above, the translation usage rate, TUR, is the frequency in which address translations are used by a client in response to an address translation request. A positive response to the test at step (208) is an indication that the translation usage rate needs to be initialized and will result in setting the TUR variable to the value of (1/Interval) (210). Similarly, a negative response to the test at step (208) is an indication that the translation usage rate has been initialized. The translation usage rate is set (212) as follows:

$$TUR \leftarrow \alpha_1(1/\text{interval}) + (1-\alpha_1)(TUR),$$

where $\alpha_1$ is a constant between zero and one. Accordingly, the process of maintaining an estimate of the usage rate of the block addresses maintained in the buffer includes using the clock value at the beginning of the last address translation as a basis for the comparison.

Figure 5:
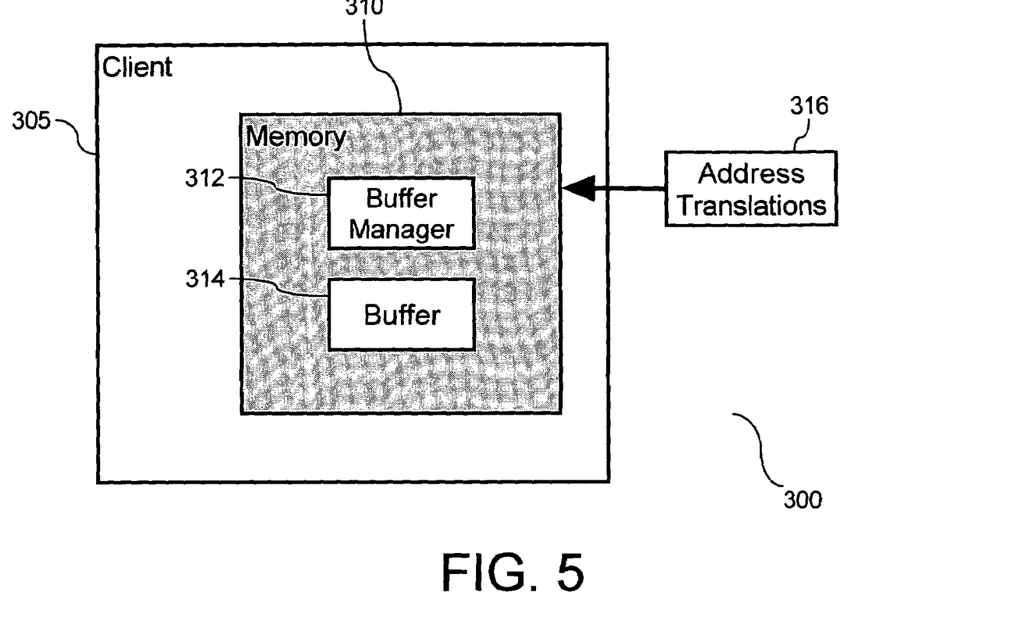
FIG. 5 is a block diagram illustrating a client machine showing the buffer and buffer manager.

The method and system for maintaining a buffer of block addresses dynamically adjusts a quantity of addresses retained in the buffer based upon historical usage of the addresses reduces network traffic and reduces latency associated with client-server communications. The method for maintaining a buffer of addresses for deferred use by a requesting client may be invoked in the form of a tool utilized by the client machine for faster communication of block addresses from the server. FIG. 5 is a block diagram (300) of a client machine (305) for use in the system showing components of the metadata allocation tool. As shown, the client machine (305) includes memory (310) having a buffer manager (312) and a buffer of address translations (314). As defined above, address translations are a collection of block addresses for read and write transactions. As address translations (316) are received by the client machine (305) from a server (not shown), they are stored in the buffer (314). The buffer manager (312) maintains a preferred quantity of address translations available for use by the client (305) to mitigate communication of address translation requests from the client (305) as well as communication of address translations received by the client machine. The buffer manager (312) is set to request additional block addresses from a server (not shown) at a rate at least matching a client calculated rate of address usage (305). Address translations (316) are stored in the buffer (314) with the buffer manager (312) maintaining and dynamically adjusting the quantity of translations held in the buffer (314) in response to historical and current address translation requests. Although the buffer manager (312) is shown residing in memory (310), it should not be limited to a software component. The buffer manager (312) may be implemented in a hardware component and reside external to the memory (310).

Figure 6:
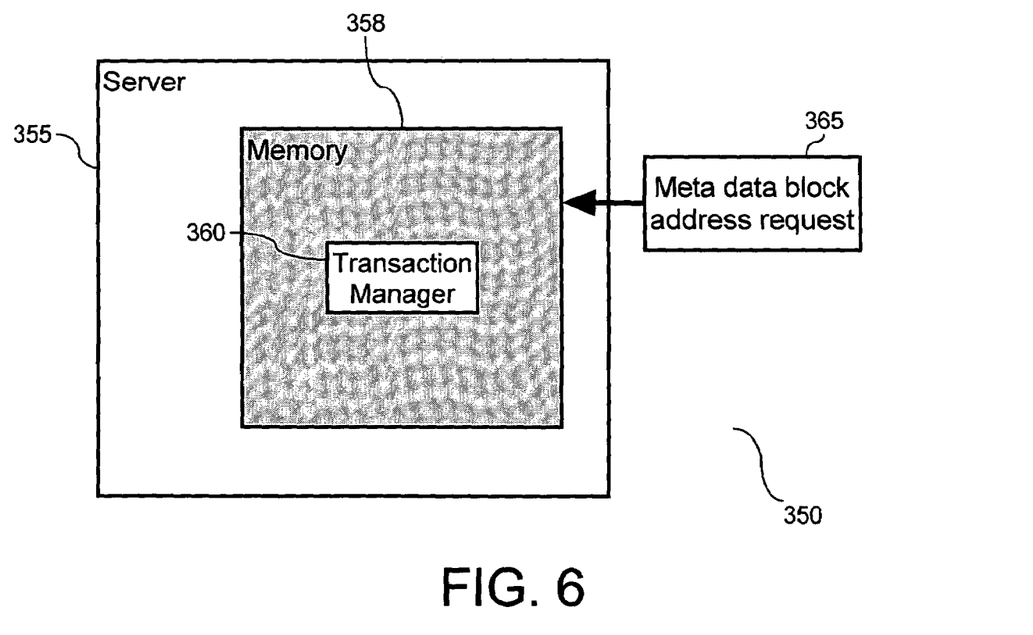
FIG. 6 is a block diagram illustrating a server showing the transaction manager.

FIG. 6 is a block diagram (350) of a server (355) for use in the system showing a component of the metadata allocation tool. As shown, the server (355) includes memory (358) having a transaction manager component (360) to facilitate forwarding of address translations of data blocks previously created data for a read or a write transaction and creation of block addresses for a write transaction. The transaction manager (360) is responsive to metadata allocation requests received from the manager (312) in the client machine (305). The transaction manager (360) is set to facilitate creation and communication of block addresses in response to a block address request for read and write transactions from a client. Although the transaction manager (360) is shown residing in memory (358), it should not be limited to a software component. The transaction manager (360) may be implemented in a hardware component and reside external to the memory (358). In relation to the components shown in FIGS. 5 and 6, the tool may include a metadata block address request (365) communicated from a client machine (305) to the server (355) across a network, and a return of address translations (316) maintained in the buffer (314) for use by the client machine (305) for reading and writing data. The buffer (314) of address translations may be utilized in response to a current client request, or a future client request.

In one embodiment, the buffer manager (312), and write transaction manager (360) may be software components stored on a computer-readable medium as it contains data in a machine readable format that function as a manager, as shown in FIGS. 5 and 6. Similarly, the buffer of available block addresses for deferred use by the client returned by the server for use by the client machine may also be embedded in memory in a machine readable format to support communication among the client machine, the server, and the storage media. For the purposes of this description, a computer-useable, computer-readable, and machine readable medium or format can be any apparatus that can contain, store, communicate, propagate, or transport the program for use by or in connection with the instruction execution system, apparatus, or device. Accordingly, the metadata block address request, returned block addresses, and buffer of available block addresses may all be in the form of hardware elements in the computer system or software elements in a computer-readable format or a combination of software and hardware.

Advantages Over the Prior Art

When a client is performing a read or write operation, the client sends a request for block address translations to a server. The translations are housed in a buffer maintained by the client and are readily available for use by current or future operations of the client. Maintaining a defined quantity of block addresses in the buffer window mitigates network traffic by reducing client-server communications. The client may obtain block addresses directly from the buffer, when available, instead of requesting block addresses from the server for each transaction. In addition, the quantity of block addresses maintained in the buffer may be adjusted based upon historical usage of block addresses. This ensures that the quantity of address translations in the buffer is neither over-utilized nor under-utilized. Additionally, the adjustment of the size of the buffer, also known as the window, may occur dynamically by tracking historical usage with each client-server transaction, or with each read and/or write operation, or both. Accordingly, the buffer serves as a tool for improving efficiency of communication with both read and write operations.

Alternative Embodiments

It will be appreciated that, although specific embodiments of the invention have been described herein for purposes of illustration, various modifications may be made without departing from the spirit and scope of the invention. In particular, the constant assigned at step (120) to increase the window of the buffer for block addresses may be modified to either increase or decrease the quantity of block addresses held in the buffer based upon system requirements. Similarly, the $\alpha_1$ and $\alpha_2$ constants may be reset from an initial value to further adjust the quantity of block addresses held in the buffer. In one embodiment, the $\alpha_1$ and $\alpha_2$ constants are preferably set at a value between zero and one, and generally are set at a value of ⅛. Similarly, other algorithms might be developed for estimating useful window sizes for future uses by the client based on usage. Additionally, the algorithms may be duplicated, once for use for read operations and once for use by write operations. Similarly, the functions outlined in the flow chart illustrations might be meaningfully separated into separate processes or execution threads to improve concurrency. In one embodiment, a separate process or execution thread will fill the buffer window with block addresses while the client read or write operations proceeds with the block addresses already at hand. Accordingly, the scope of protection of this invention is limited only by the following claims and their equivalents.

We claim:

1. A method for managing metadata comprising:
 a client buffer manager sending a request for additional block address translations for sequential data segments to a server prior to said address translations being requested by said client;
 maintaining a first available address translation in a client buffer for supporting a write request prior to receipt of the request;
 sending a block address translation request from a client machine;
 receiving said first address translation from said buffer in response to said address translation request from said client;
 writing data to said first address translation;
 a server calculating and tracking a usage rate of said block address translations with each request and predicting an optimal number of block address translations to request using said usage rate; and
 the buffer manager requesting the predicted optimal number of block address translations.

2. The method of claim 1, wherein the step of maintaining a first available address translation in said client buffer includes sending a request for additional address translations at a rate at least matching said calculated usage rate.

3. The method of claim 2, further comprising adaptively modifying a minimum size of said buffer according to said usage rate and a server response time variable.

4. The method of claim 3, wherein a size of said buffer is modified based on the usage rate of block addresses by the client, wherein usage is selected from a group consisting of: reading data and writing data.

5. The method of claim 1, further comprising said client writing data to a created address concurrent with creation of additional address translations by said server.

6. A method for managing allocation of metadata, comprising:
 a server receiving a metadata block address translation request for sequential data segments from a client manager prior to receiving a client request for said address translation request; and
 streaming metadata block address translations to a buffer maintained by said client responsive to said request, including replacing block address translations in said buffer subject to a write transaction with available block address translations,
 wherein said buffer maintains said streamed block address translations for use by said client;
 a server calculating and tracking a usage rate of said block address translations with each request and predicting an optimal number of block address translations to request using said usage rate; and
 a buffer manager requesting the predicted optimal number of block address translations.

7. A system for allocating metadata comprising:
 a buffer manager communicating a block address translation request received from a client machine to a server;
 said buffer manager receiving a requested block address translation in response to said request;
 a client maintained buffer in communication with said buffer manager maintaining said received block address translation by said buffer manager for use by said client;

a server calculating and tracking a client usage rate of said block addresses and predicting an optimal number of block address translations to request using said usage rate;

wherein said buffer manager requests the predicted optimal number of address translations at a rate at least matching said client calculated rate of block usage.

8. The system of claim 7, wherein said buffer manager is adapted to modify a minimum size of said buffer based on said block usage rate of said client and a server responsiveness rate.

9. The system of claim 8, wherein said buffer manager is adapted to modify a size of said buffer based on a rate of use of block addresses by said client, wherein said use is selected from a group consisting of: reading data and writing data.

10. The system of claim 9, wherein said buffer manager supports a client write operation to a created address concurrent with receipt of an additional address translation.

11. An article comprising:

a computer readable recordable data storage medium;

instructions in the medium to send a block address translation request from a client machine to a server;

instructions in the medium to receive an address translation from the server in response to the address request; and a buffer of available block address translations maintained for use by the client;

wherein said instructions to maintain a buffer of available address translations includes a server calculating and tracking a client usage rate of said block address translations, predicting an optimal number of block address translations to request using said usage rate, and sending a request for the predicted optimal number of address translations at a rate at least matching said client calculated rate of address translation usage.

12. The article of claim 11, further comprising instructions to adaptively modify a minimum size of said buffer according to said usage rate of said client and a server responsiveness rate.

13. The article of claim 12, wherein a size of said buffer is modified based on a rate of use of the block addresses by the client, wherein said use is selected from the group consisting of: reading data and writing data.

14. The article of claim 11, further instructions for the client to write data to the created addresses concurrent with creation of additional address translations by a server.

15. The article of claim 11, further comprising instruction to create additional address translations concurrent with said client writing data to previously created addresses maintained in the buffer.

* * * * *